United States Patent [19]

Sandberg

[11] Patent Number: 4,666,409

[45] Date of Patent: May 19, 1987

[54] HOLDER FOR DISPLAY CARDS

[76] Inventor: Gary L. Sandberg, 2013 Meadowlark Way, Sandy, Utah 84092

[21] Appl. No.: 839,615

[22] Filed: Mar. 14, 1986

[51] Int. Cl.⁴ .............................................. G09B 1/12
[52] U.S. Cl. ..................................... 434/365; 40/390; 40/530; 248/441.1; 281/25 A; 281/45
[58] Field of Search ............... 434/365, 347, 191, 172; 40/119, 120, 530, 586, 388, 390; 281/21 A, 25 A, 42, 45; 248/441.1, 444, 451

[56] References Cited

U.S. PATENT DOCUMENTS

| | | | |
|---|---|---|---|
| 1,296,304 | 3/1919 | Marx | 40/120 |
| 1,900,321 | 3/1933 | White | 281/25 A |
| 2,278,143 | 3/1942 | Matthews | 281/42 |
| 2,523,202 | 9/1950 | Erickson | 40/388 X |
| 2,982,568 | 5/1961 | Wolfe | 248/441.1 X |
| 3,934,806 | 1/1976 | Rady | 248/441.1 X |
| 4,515,566 | 5/1985 | Sprague | 434/172 |

Primary Examiner—William H. Grieb
Attorney, Agent, or Firm—M. Ralph Shaffer

[57] ABSTRACT

A holder for display cards comprising an upstanding back panel, a forwardly directed base flange integral with said panel, and a handle depending from said base flange. The upper surface of such base flange is provided a D-ring assembly which is or can be standard for class notebooks. Such assembly is preferably riveted to and against the upper surface of the base flange. The D-ring assembly is spaced from the forward surface of the upstanding back panel so as to accommodate a rearward leaning of upstanding cards retained by the D-ring assembly; the forward edges of the D-ring assembly and base flange are aligned, or proximately so, so that cards supported by the D-ring assembly and extending downwardly are in approximate vertical disposition. The spacing between the D-ring assembly and the back panel can be employed for a variety of purposes.

6 Claims, 3 Drawing Figures

HOLDER FOR DISPLAY CARDS

FIELD OF INVENTION

The present invention relates to holders for display cards, sometimes commonly known as flash cards and, more particularly, to a new and improved holder suitable for classroom and other types of uses.

DESCRIPTION OF PRIOR ART

No U.S. or foreign patent literature is currently known to the inventor relating to display card or flash card holders. Common practice, of course, is to retain flash cards in a box; the teacher then removes the set of cards from such box and holds them up, one at a time, for problems to be solved by students. This will include letter, character, numeral, and name recognition, arithmetic problems, and so forth.

Certain types of card sets have previously been known to be loosely secured together; however, the set is very awkward to manipulate during classroom or other use. It would of course be desirable to devise a holder that can be easily held by one hand, leaving the remaining hand free to flip the cards in a desired, by without the entire card assembly being disassociated or apt to fall to the floor.

BRIEF DESCRIPTION OF PRESENT INVENTION

According to the present invention, the improved holder includes a vertical, upstanding back panel made integral with a lower, horizontal, forwardly projecting base flange of somewhat reduced dimension. A D-ring assembly is riveted or otherwise secured to the upper surface of such base flange, this in a manner that appreciable space exists between the rear side of the D-ring assembly and the forward surface of the back panel. This is convenient for slanting upstanding cards, when the holder is held in erect position, so that cards will not fall forward of themselves. The forward edge of the D-ring assembly is closely aligned with the forward edge of such base flange, this so that cards that are turned and are suspended from the D-ring assembly may fall down vertically or nearly so, to accommodate additional cards after they are once used and displayed from their upper vertical position. Suitable rivet or other means are used to secure the D-ring assembly to the upper surface of such base flange. A handle is affixed to and depends from the lower surface of the base flange and may be provided with a suitable cap. The handle will generally be from 5 to 8 inches long, to accommodate conveniently the hand of the user. Other dimensions, of course, may be selected.

The cards employed have holes matching the rings of the 3-ring assembly so that the cards can be mounted thereto.

OBJECTS

Accordingly, a principal object of the present invention is to provide a new and improved holder for display cards.

A further object is to provide a combination including a hand-held holder and hole-punched display cards for employment therewith and attachment thereto.

An additional object is to provide a holder having an upturned back panel relieved rearwardly from an incorporated D-ring assembly such that upstanding cards slope rearwardly prepatory to display and subsequent folding down over the forward edge of an incorporated base flange in the holder, so that the cards assume an essentially lower vertical disposition.

BRIEF DESCRIPTION OF THE DRAWINGS

The present invention may best be understood by reference to the following description, taken in connection with the accompanying drawings in which.

DESCRIPTION OF PREFERRED EMBODIMENTS

Figure 1:
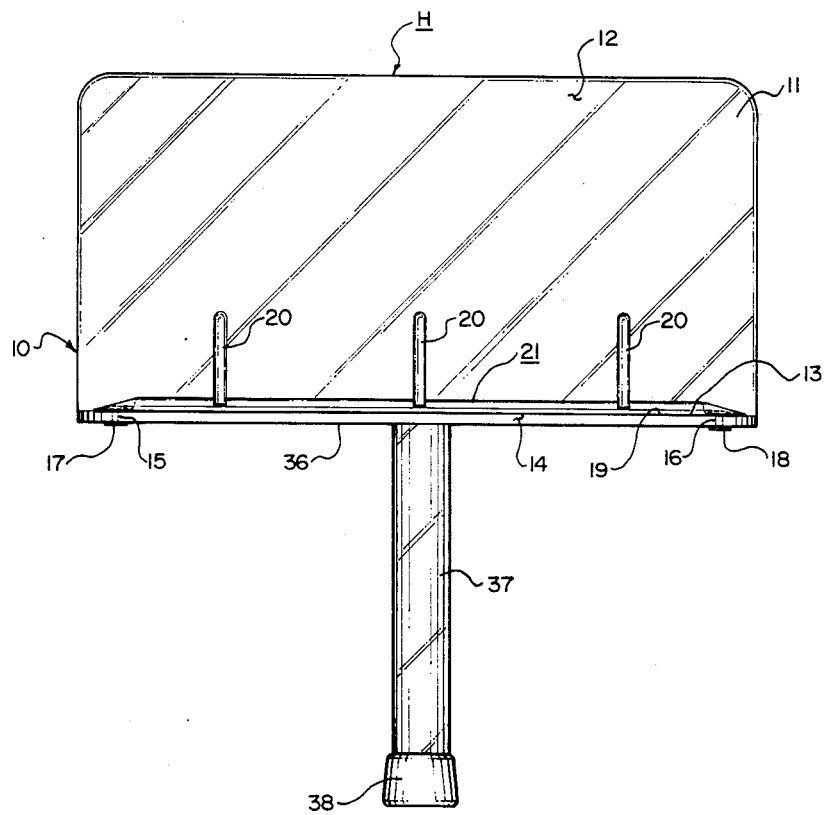
FIG. 1 is a front elevation of a holder in a preferred form of the invention showing essential details thereof.

In FIG. 1 principal member 10 is shown to include an upstanding back panel 11 having a forward surface or face 12 preferably integrally formed with upstanding back panel 11, and includes a forwardly projecting base flange 13, the same preferably molded to the back panel. In a preferred structure, acrylic sheet can be contoured and formed in the shape indicated. Base flange 13 of course will have a forward edge 14. Holes will be drilled at 15 and 16 in such base flange to accommodate rivets 17 and 18. These rivets can be eyelet rivets and secure a D-ring assembly, commonly known simply as a "D-ring," to the upper surface 19 of base flange 13. The D-ring assembly is a standard part manufactured, by way of example, by the Loose-leaf Metals Company of St. Louis, Mo., the same going under nomenclature "D-ring". Such D-rings are commonly employed in student notebooks for securing two-hole or three-hole paper in such notebooks. The D-ring will include the usual internal standard structure, not shown and forming no part of the present invention of itself, which structure is coupled to the exposed split ring elements 20 of the D-ring assembly 21.

Figure 2:
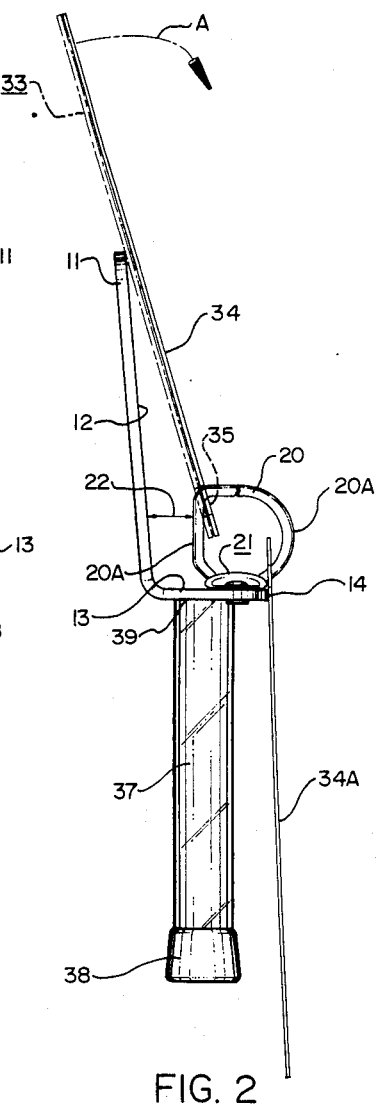
FIG. 2 is a left side elevation of the structure of FIG. 1, illustrating the display cards, commonly known as flash cards, as being attached to lean against the forward surface of the upstanding back panel of the holder, certain cards being turned over and resting downwardly proximate the forward edge of the base flange of the holder.
Figure 3:
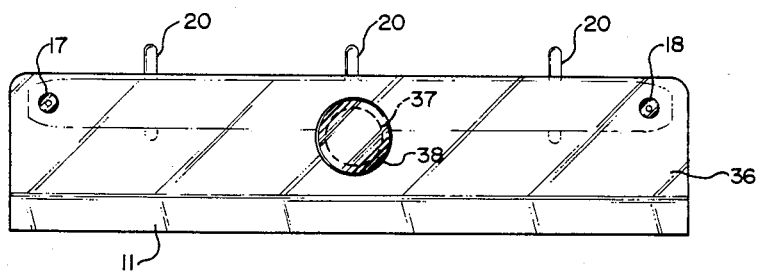
FIG. 3 is a bottom plan of the structure illustrated in FIG. 1.

FIG. 2 illustrates that a space 22 exists between the rear of the D-ring structure and the forward face 12 of the upstanding back panel 11. This is for the purpose of insuring a slanting disposition of display cards where such cards as at 23 are disposed upwardly to lean against the upper forward surface 12 of panel 11. The forwardmost card 34 will have on its surface suitable intelligence indicia such as a letter or numeral, for example, which is displayed to the students; once that card is used, then the user simply employs one hand to take that card and move it downwardly and outwardly such that the same falls in an essentially vertical disposition as shown at 34A. The cards 33 will be punched with holes 35 to accommodate the several D-ring elements 20.

To bottom surface 36 of base flange 13 there will be secured a handle 37, and such handle may be provided with a convenient cap at 38 if desired. Securement of the upper end 39 of the handle can be accomplished by the use of an acrylic glue or other type of suitable substance, conventionally known, which causes plastics to adhere together in a rigid molecular bond. Many types of attachments, of course, can be employed.

In operation the user of course will be provided with a series of cards that are drilled to provide holes constructed to admit the D-ring elements 20 when the same are opened. Closure of the D-rings in a customary manner mounts the cards to the holder, and initially the cards will be disposed in an erect though rearwardly leaning condition as illustrated in FIG. 2 proximate back panel 11. The forward face of each card is exposed to the students. It is noted that the teacher need only employ one hand, say the left hand, to hold the holder firmly by handle 37 such that the holder is in an erect or upright position as shown in FIG. 2. With the right hand he or she need only turn the cards, as they are displayed, in the direction of the arrow A so that such cards will proceed downwardly, suspended from the D-ring elements to a lower vertical position as shown at 34A in FIG. 2.

It will be noted that a variety of types of cards can be employed in the structure. By way of example, the cards may be essentially square, rectangular with the long dimension either vertical or horizontal, or other card shapes can be employed. Additionally, the card surfaces may include a number of types of intelligence-bearing indicia, such as letters, numbers, words, or "still" settings or pictures of stories which are popular or of use to children or other audiences. The space provided at 22 may be suitable for storage of cards or other paraphernalia; the prime purpose of the offset of back panel 11 relative to the rear surface of the D-ring elements is to accommodate a rearward leaning of the upstanding cards so that the same will not fall forward inadvertently.

Accordingly, what is provided is a new and improved holder for display cards or flash cards, and the combination of a holder which mounts such cards, which is very easy to manipulate, is portable, and can fulfill a variety of functions.

It will be noted that D-ring elements are openable and closeable in accordance with standard practice of notebook ring assemblies. In the present case the flat horizontal portion 20A of the individual D-ring elements are vertical and horizontally spaced, preferably, from the forward face 11 of back panel 12. In this way the cards can lean properly, rearwardly, against the upstanding back panel and, when they are urged forwardly, can take advantage of the curved portion 20B of the ring elements which project slightly forwardly, thereby allowing the cards to fall downwardly in the manner indicated in FIG. 2 relative to holder H.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A manually-operated holder for display cards including, in combination: a principal member having an upstanding back panel, provided a forward face, and a lower, forwardly extending base flange integral with said back panel at a lower portion of the latter, said base flange having an upper surface; an elongate D-ring assembly secured to and along said base flange at said upper surface thereof, said D-ring assembly being parallel to but spaced forwardly from said forward face of said back panel; and a handle depending from and secured to said base flange.

2. Structure according to claim 1 wherein said D-ring assembly includes openable D-ring elements having essentially straight rear sides parallel to but spaced from said forward face of said back panel.

3. Structure according to claim 1 wherein said D-ring assembly is provided with rivet means for securing said assembly to said base flange.

4. Structure according to claim 1 wherein said principal member comprises a molded part.

5. Structure according to claim 1 wherein said base flange has a forward edge, said D-ring assembly being proximate said forward edge.

6. A manually-operated holder and display card set combination for display cards including, in combination: a holder comprising a principal member having an upstanding back panel, provided a forward face, and a lower, forwardly extending base flange integral with said back panel at a lower portion of the latter, said base flange having an upper surface; an elongate D-ring assembly secured to and along said base flange at said upper surface thereof, said D-ring assembly being parallel to but spaced forwardly from said forward face of said back panel; a handle depending from and secured to said base flange; and a set of hole-drilled display cards mounted to said D-ring assembly and selectively leaning rearwardly against said back panel preparatory to progressively downward manipulation.

* * * * *